United States Patent
Trabelsi (10) Patent No.: US 10,127,385 B2
(45) Date of Patent: Nov. 13, 2018

(54) AUTOMATED SECURITY VULNERABILITY EXPLOIT TRACKING ON SOCIAL MEDIA

(71) Applicant: SAP SE, Walldorf (DE)

(72) Inventor: Slim Trabelsi, Biot (FR)

(73) Assignee: SAP SE, Walldorf (DE)

( * ) Notice: Subject to any disclaimer, the term of this patent is extended or adjusted under 35 U.S.C. 154(b) by 387 days.

(21) Appl. No.: 14/843,482

(22) Filed: Sep. 2, 2015

(65) Prior Publication Data

US 2017/0061133 A1  Mar. 2, 2017

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/57* | (2013.01) |

(Continued)

(52) U.S. Cl.
CPC ...... *G06F 21/577* (2013.01); *G06F 17/30864* (2013.01); *H04L 63/1433* (2013.01); *G06F 2221/033* (2013.01)

(58) Field of Classification Search
CPC . H04L 63/1433; H04L 63/1408; H04L 63/14; H04L 63/1425; G06F 21/577; G06F 17/30864
See application file for complete search history.

(56) References Cited

U.S. PATENT DOCUMENTS

| | | | |
|---|---|---|---|
| 7,200,720 B1 * | 4/2007 | Yang ................. | G06F 17/30348 707/999.2 |
| 7,240,067 B2 | 7/2007 | Timmons | |
| 7,711,750 B1 | 5/2010 | Dutta et al. | |

(Continued)

OTHER PUBLICATIONS

Arafin et al., Vulnerability Exploits Advertised on Twitter, 2013.*

(Continued)

*Primary Examiner* — Trong H Nguyen
(74) *Attorney, Agent, or Firm* — Fountainhead Law Group P.C.

(57) ABSTRACT

Embodiments automate tracking of exploit information related to initially-identified security vulnerabilities, through the data mining of social networks. Certain social network communities (e.g., those frequented by hackers) share information about computer security breaches (zero-day events). Embodiments recognize that further relevant security information may be revealed, in conjunction with and/or subsequent to such initial zero-day vulnerability disclosures. That additional information can include valuable details regarding known (or unknown) vulnerabilities, exploit codes and methodologies, patches, etc. Tracking that additional information can benefit security researchers/experts/law enforcement personnel. Embodiments monitoring social media traffic based upon initial security vulnerability information, perform analysis to detect patterns and create relevant keywords therefrom. Those keywords in turn form a basis for generating social media stream(s) responsible for harvesting additional security-relevant data. Results of further analysis of the social media stream can be fed back in an iterative manner to refine pattern detection, keyword creation, and media stream generation.

7 Claims, 7 Drawing Sheets

(51) Int. Cl.
*G06F 17/30* (2006.01)
*H04L 29/06* (2006.01)

(56) References Cited

U.S. PATENT DOCUMENTS

| | | | |
|---|---|---|---|
| 7,774,459 | B2 | 8/2010 | Wang et al. |
| 8,046,348 | B1 | 10/2011 | Rehling et al. |
| 8,302,197 | B2 | 10/2012 | Huang et al. |
| 8,468,244 | B2 | 6/2013 | Redlich et al. |
| 8,484,228 | B2 | 7/2013 | Bhattacharyya et al. |
| 8,572,740 | B2 | 10/2013 | Mashevsky et al. |
| 8,725,495 | B2 | 5/2014 | Peng et al. |
| 8,739,288 | B2 | 5/2014 | Diamant et al. |
| 8,763,132 | B2 | 6/2014 | Shanley |
| 8,788,260 | B2 | 7/2014 | Nygaard et al. |
| 9,122,989 | B1 | 9/2015 | Morris et al. |
| 9,158,915 | B1 * | 10/2015 | Yumer ................. G06F 21/552 |
| 9,172,608 | B2 | 10/2015 | Zeyliger et al. |
| 9,361,337 | B1 | 6/2016 | Bhave et al. |
| 2003/0009696 | A1 * | 1/2003 | Bunker V. ............... H04L 43/00 726/26 |
| 2003/0120949 | A1 | 6/2003 | Redlich et al. |
| 2004/0010502 | A1 | 1/2004 | Bomfim et al. |
| 2007/0169199 | A1 | 7/2007 | Quinnell et al. |
| 2007/0233782 | A1 | 10/2007 | Tali |
| 2008/0065646 | A1 | 3/2008 | Zhang et al. |
| 2009/0164449 | A1 | 6/2009 | Huang |
| 2011/0173193 | A1 | 7/2011 | Ahn et al. |
| 2012/0191594 | A1 | 7/2012 | Welch et al. |
| 2012/0304244 | A1 | 11/2012 | Xie et al. |
| 2013/0124545 | A1 | 5/2013 | Holmberg et al. |
| 2014/0020065 | A1 | 1/2014 | Motgi et al. |
| 2014/0059203 | A1 | 2/2014 | Trabelsi et al. |
| 2014/0089038 | A1 | 3/2014 | Bagheri et al. |
| 2015/0242515 | A1 | 8/2015 | Trabelsi et al. |

OTHER PUBLICATIONS

Sabottke et al., Vulnerability Disclosure in the Age of Social Media Exploiting Twitter for Predicting Real-Word Exploits, 2015.*
Mulwad et al., Extracting Information about Security Vulnerabilities from Web Text, 2011.*
Trabelsi et al., Monitoring Software Vulnerabilities through Social Networks Analysis, 2015.*
Trabelsi et al., Mining Social Networks for Software Vulnerabilities Monitoring, 2015.*
Adrian Kingsley-Hughses, Internet Article entitled "Secunia PSI—This One Free Download Will Make Your PC Dramatically Safer," Apr. 12, 2012. Retrieved from: forbes.com/sites/adriankingsleyhughes/2012/04/12/secunia-psi-this-one-free-download-will-make0your-pc-dramatically-safer/.
Internet Article entitled "Security Database—before it comes upon you," retrieved on Jan. 21, 2014 from: www.security-database.com.
Internet Article entitled "NetBase Social Media Management (SMMS): Designed for Business Impact," retrieved on Jan. 21, 2014 from www.netbase.com/social-media-management.
Internet Article entitled "Improve your security, prioritize resources, cut time and costs, and stay ahead of the latest threats through VUPEN solutions," retrieved on Jan. 21, 2014, from VUPEN security.
ThreatSecure.com at http://www.threattracksecurity.com/enterprise-security/advanced-persistent-threat.aspx (as of Jul. 17, 2015).
MD Tanvir Arafin and Richard Royster—Internet Article entitled "Vulnerability Exploits Advertised on Twitter" retrieved on Jul. 21, 2015 from http://www.umiacs.umd.edu/~tdumitra/courses/ENEE759D/Fall13/project_reports/twitter.pdf.

* cited by examiner

AUTOMATED SECURITY VULNERABILITY EXPLOIT TRACKING ON SOCIAL MEDIA

BACKGROUND

Unless otherwise indicated herein, the approaches described in this section are not prior art to the claims in this application and are not admitted to be prior art by inclusion in this section.

Embodiments relate to computer security, and in particular, to automated tracking on social media of exploitation of security vulnerabilities.

Timely/accurate detection of security breach exploits based upon new unpatched software vulnerabilities, is a crucial action that can aid experts, law enforcement, researchers, and software developers quickly understand the failure mechanism (e.g., in the code source of the software), and resolve the issue by fixing the unsecure portion of code.

While having notice of the security breach itself (zero-day event) is valuable, possessing more details concerning the exploit code and/or methodology, can rapidly accelerate the response time for fixing the issue. The problem with such disclosures of security vulnerabilities, however, is that the software vendor may not aware of these publications.

Embarrassment for the software vendor may result when the initial exploit of a zero-day vulnerability is made public. More importantly, however, such an initial security breach likely exposes the software to follow-up attacks from malicious actors seeking to further exploit the vulnerability.

SUMMARY

Embodiments automate tracking of exploit information related to initially-identified security vulnerabilities, through the data mining of social networks. Certain social network communities (e.g., those frequented by hackers) share information about computer security breaches (zero-day events). Embodiments recognize that further relevant security information may be revealed, in conjunction with and/or subsequent to such initial zero-day vulnerability disclosures. That additional information can include valuable details regarding known (or unknown) vulnerabilities, exploit codes and methodologies, patches, etc. Tracking that additional information can benefit security researchers/experts/law enforcement personnel. Embodiments monitoring social media traffic based upon initial security vulnerability information, perform analysis to detect patterns and create relevant keywords therefrom. Those keywords in turn form a basis for generating social media stream(s) responsible for harvesting additional security-relevant data. Results of further analysis of the social media stream can be fed back in an iterative manner to refine pattern detection, keyword creation, and media stream generation.

An embodiment of a computer-implemented method comprises an engine receiving data harvested according to a parameter by a streaming component. The engine processes the data according to a ruleset to generate information relating to an exploit of a zero-day security vulnerability. The engine stores the information in a database, and the engine communicates the information to a user.

An example of a non-transitory computer readable storage medium embodies a computer program for performing a method comprising an engine receiving data harvested according to a parameter by a streaming component, the parameter comprising a keyword. The engine processes the data according to a ruleset to generate information relating to an exploit of a zero-day security vulnerability. The engine stores the information in a database, and the engine communicates the information to a user.

A computer system according to an embodiment comprises one or more processors and a software program executable on said computer system. The software program is configured to cause an engine to reference a zero-day security vulnerability to generate a parameter, and communicate the parameter to a streaming component. The software program is also configured to cause the engine to receive data harvested by the streaming component according to the parameter, and to process the data according to a ruleset to generate information relating to an exploit of the zero-day security vulnerability. The software program is further configured to cause the engine to store the information in a database, and to communicate the information to a user.

Certain embodiments further comprise the engine referencing the zero-day security vulnerability to generate the parameter, and the engine communicating the parameter to the streaming component.

Some embodiments further comprise the engine generating an updated parameter from the information, and the engine sending the updated parameter to the streaming component.

Various embodiments further comprise the engine receiving from the streaming component, updated data harvested according to the updated parameter, and the engine processing the updated data according to the ruleset to generate updated information regarding another exploit of the zero-day security vulnerability. The engine stores the updated information, and communicates the updated information to the user.

According to particular embodiments, the data indicates a patch of the zero-day security vulnerability, and the updated parameter comprises an instruction to halt streaming activity.

In certain embodiments the information comprises an alert.

In some embodiments the data includes a date of the zero-day security vulnerability, a date of the exploit, a product identity, a hacker identity, a nature of the zero-day security vulnerability, and/or an exploit methodology.

In various embodiments the engine processes the data to compute a vulnerability score.

According to particular embodiments, the database comprises an in-memory database and the engine comprises an in-memory database engine.

The following detailed description and accompanying drawings provide a better understanding of the nature and advantages of embodiments.

DETAILED DESCRIPTION

Described herein are methods and apparatuses configured to automatically track on social media, the exploitation of security vulnerabilities in a computer system. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments automate tracking of exploit information related to initially-identified security vulnerabilities, through the data mining of social networks. Certain social network communities (e.g., those frequented by hackers) share information about computer security breaches (zero-day events). Embodiments recognize that further relevant security information may be revealed, in conjunction with and/or subsequent to such initial zero-day vulnerability disclosures. That additional information can include valuable details regarding known (or unknown) vulnerabilities, exploit codes and methodologies, patches, etc. Tracking that additional information can benefit security researchers/experts/law enforcement personnel. Embodiments monitoring social media traffic based upon initial security vulnerability information, perform analysis to detect patterns and create relevant keywords therefrom. Those keywords in turn form a basis for generating social media stream(s) responsible for harvesting additional security-relevant data. Results of further analysis of the social media stream can be fed back in an iterative manner to refine pattern detection, keyword creation, and media stream generation.

Figure 1A:
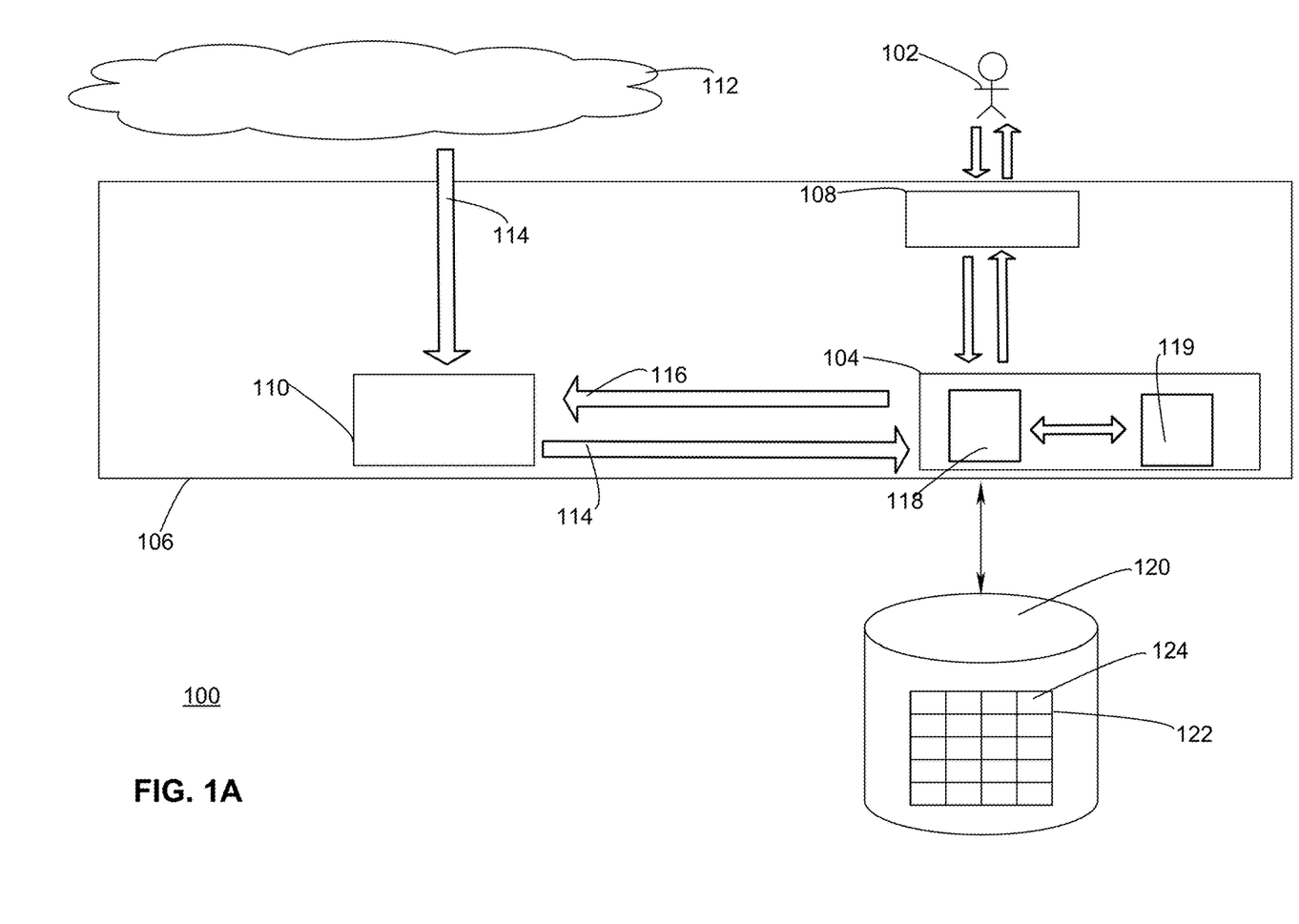
FIG. 1A shows a simplified view of a system according to an embodiment.

FIG. 1A presents a simplified view of a system 100 according to an embodiment. In particular, user 102 interacts with a security exploit tracking system 104 of an application layer 106, via user interface 108.

A streaming component 110 of the application layer, is in communication with the internet 112. That streaming component is configured collect data 114 from social media sources. A variety of techniques may be used for this purpose (including but not limited to Really Simple Syndication-RSS) relying upon keywords and date ranges. The streaming component then forwards that data to engine 118 of the tracking system.

The engine then processes that data according to a ruleset 119. Based upon that processing, the engine may in turn communicate information relating to a security exploit, back to the user.

The engine may also be configured to provide parameter 116 to the streaming component to serve as a basis for data harvesting. That parameter may take the form of an initial zero-day security breach previously detected.

The tracking system is further in communication with a non-transitory computer readable storage medium 120. That non-transitory computer readable storage medium is configured to include relational database 122 including security-relevant information 124.

Such security-relevant information stored in the database, can include but is not limited to:

date of a zero-day security vulnerability;
date of a subsequently tracked exploit;
data source of a zero-day security vulnerability;
data source of a subsequently tracked exploit;
nature of a zero-day security vulnerability;
nature of a subsequently tracked exploit;
date of any remedial measure (e.g., patch);
nature of any remedial measure.

Other types of stored security-related information may be referenced by the tracking system and its engine. For example, the National Institute of Standards and Technology (NIST) maintains a National Vulnerability Database (NVD) as a U.S. government repository of standards-based vulnerability management data. That data allows automation of vulnerability management, security measurement, and compliance. Part of this knowledge base includes a Common Vulnerabilities Exposure (CVE) database.

That CVE database includes as a metric, a Common Vulnerability Scoring System (CVSS) number. According to this framework, an exploitable security vulnerability has a higher severity score (CVSS) than a non-exploitable one, due to the resources required to execute the attack.

Such an exploitable vulnerability can be executed by any non-expert malicious user. By contrast, a non-exploitable vulnerability requires malicious hacking expert(s) in order to create the exploit.

Thus according to embodiments, an engine may function to analyze the streamed data and assign (or update) a respective severity score. That severity score information (including legacy scores) may be stored in the database.

Still other types of stored security-related information may be referenced by the tracking system and its engine. In particular, data may also be stored which aids the streaming component in locating and returning information pertinent to zero-day events and follow-on security exploits (e.g., streaming parameters such as keywords, date ranges, others).

Thus as exploit information is harvested and updated, and more accurate information becomes available, the engine may refine the parameters that are sent to the streaming component to serve as the basis for gathering of information. Examples of refined parameters can include identification of additional malicious actors, their locations, techniques utilized, and other specific information that may prove useful to the streaming component in conducting further tracking efforts.

In this manner, the arrows 114 and 116 shown in FIG. 1A may illustrate operation in an iterative manner. That is, in response to recent security exploit data received from the streaming component, the engine may feed back updated parameter information to serve as a basis for the streaming component in turn receiving updated, more relevant information from social media outlets.

Figure 1B:
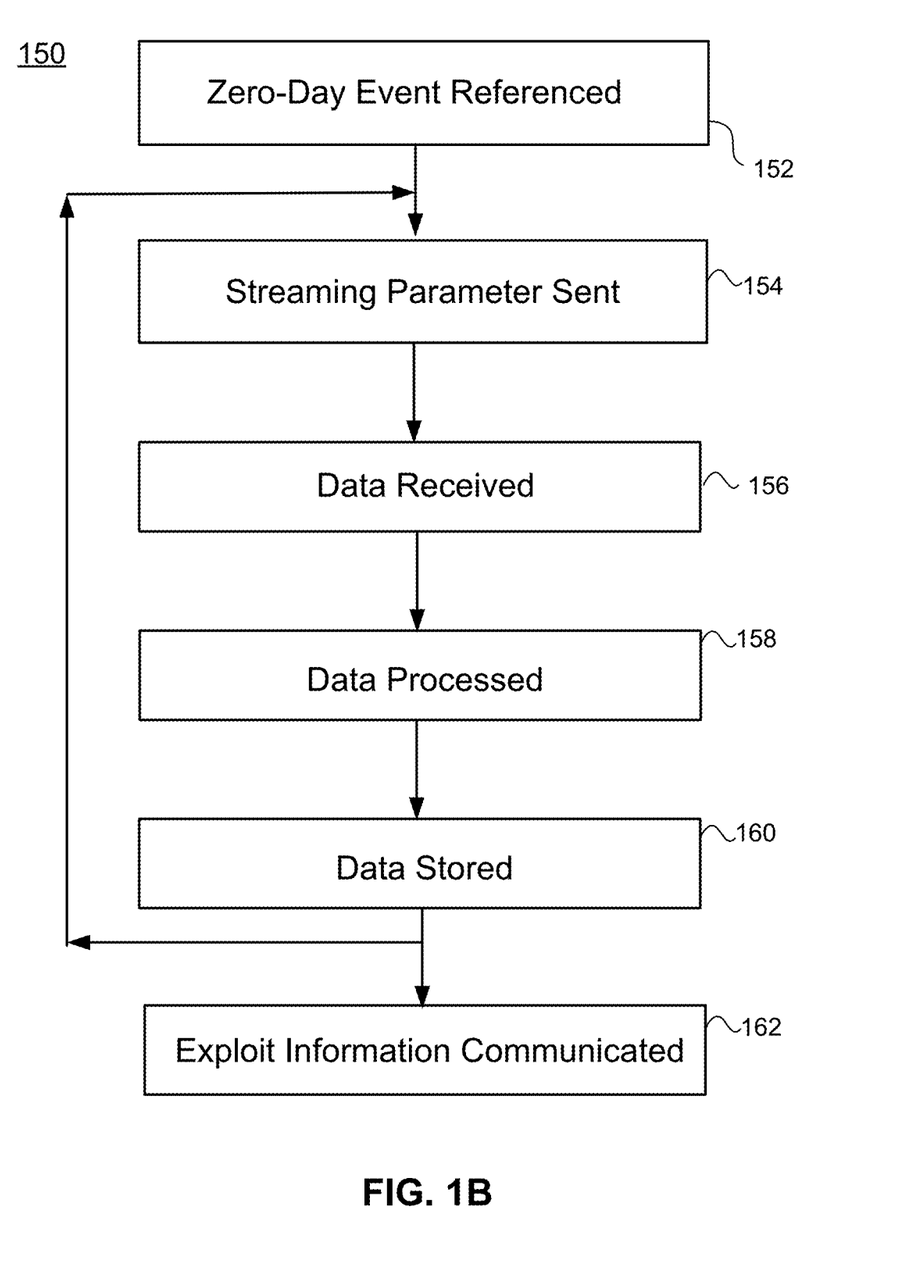
FIG. 1B shows a simplified process flow according to an embodiment.

FIG. 1B is a simplified flow diagram showing a method 150 according to an embodiment. In a first step 152, an engine of the tracking system references a zero-day event indicating an initial security breach. That zero-day event knowledge may have been originally detected via the tracking system itself, or alternatively may have come from another source.

In a second step 154, based upon the zero-day event knowledge, the engine generates and sends to a streaming component, parameter(s) relevant to tracking follow-up exploits of that zero-day event. Such parameters can be based upon considerations including but not limited to, the date of the zero-day event, the victimized product, the identity of the malefactor, and the nature of the vulnerability.

In a third step 156, the engine receives tracking data harvested by the streaming component on the basis of the parameters, from social media sources. In a fourth step 158, the engine processes the tracking data to identify follow-up exploits to the zero-day vulnerability.

In a fifth step 160, data relevant to exploit(s) of the zero-day vulnerability are stored. As shown in the feedback loop, that stored data can in turn form the basis for the generation of modified streaming parameters communicated from the engine to the streaming component.

In a sixth step 162, exploit information harvested by the tracking is communicated to a user. In certain embodiments, such exploit information may be sent in the form of an alert that is broadcast to the user (as well as others who may be designated) via a monitoring interface.

Under some circumstances, processed data that is stored, may unequivocally indicate a conclusion of the security vulnerability. For example, the streaming component may return data indicating creation and circulation of a patch that successfully eliminates the security vulnerability.

In such cases, the tracking system may instruct the streaming component to halt further tracking of information related to the zero-day vulnerability. Alternatively, however, the engine may continue to have the streaming component monitor developments for a predetermined time as a precautionary measure to ensure that the patch is in fact effective and has not in fact somehow been circumvented.

Further details regarding implementation of security monitoring according to embodiments, are now provided in connection with the following example.

Example

Figure 2:
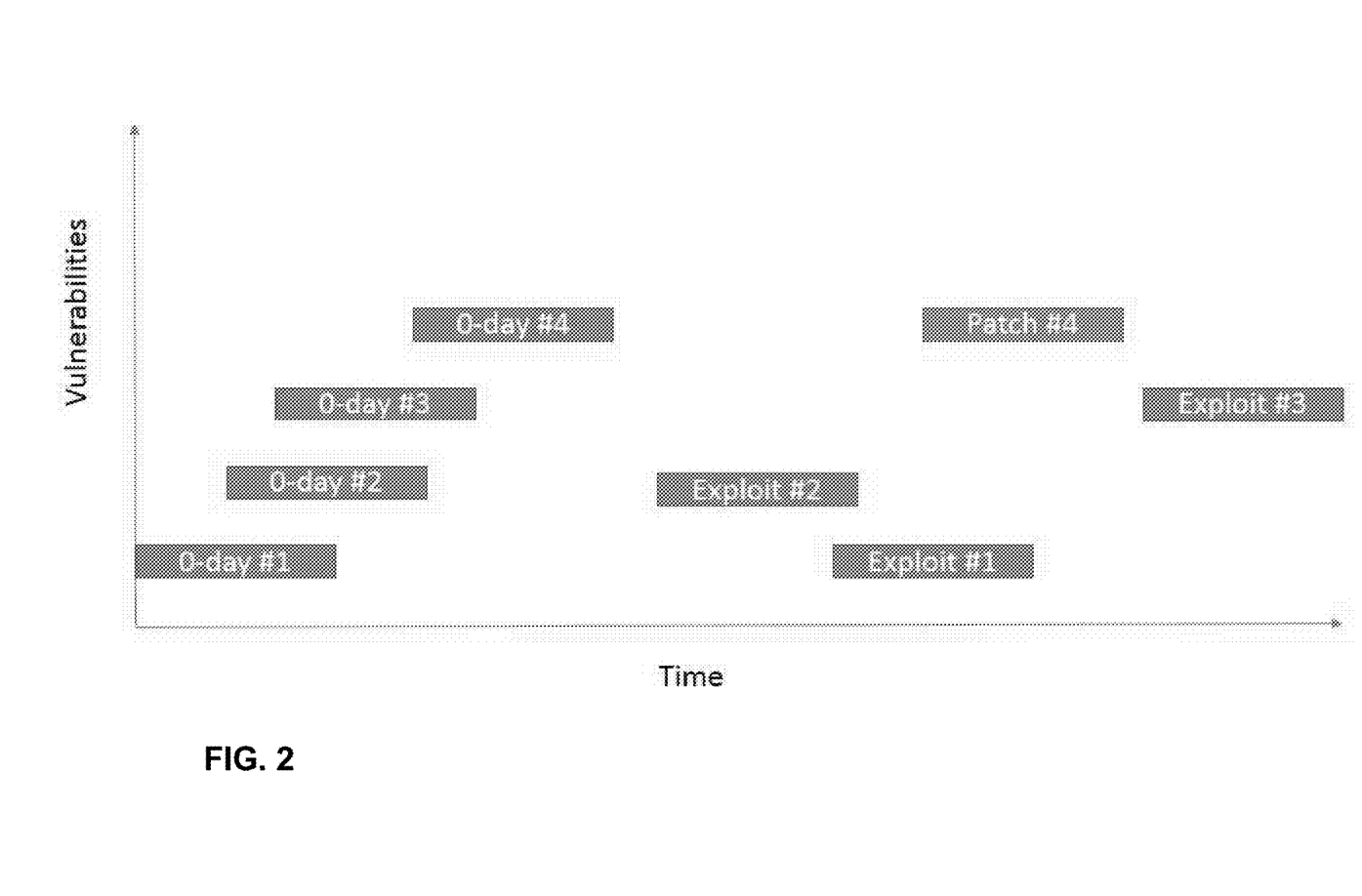
FIG. 2 shows a timeline of events in an example.

FIG. 2 shows a timeline of events in an example. In particular, an initial security vulnerability in a first computer product (0-day #1), is detected. A first exploit of that security vulnerability (Exploit #2) later follows.

FIG. 2 shows similar zero-day security vulnerabilities followed-up by respective exploits, for additional products (#2-#3). For a fourth computer product #4, FIG. 2 shows an initial zero-day vulnerability, followed by a patch. Such a patch eliminates the security vulnerability, which in certain embodiments may result in cessation of tracking efforts.

Figure 3:
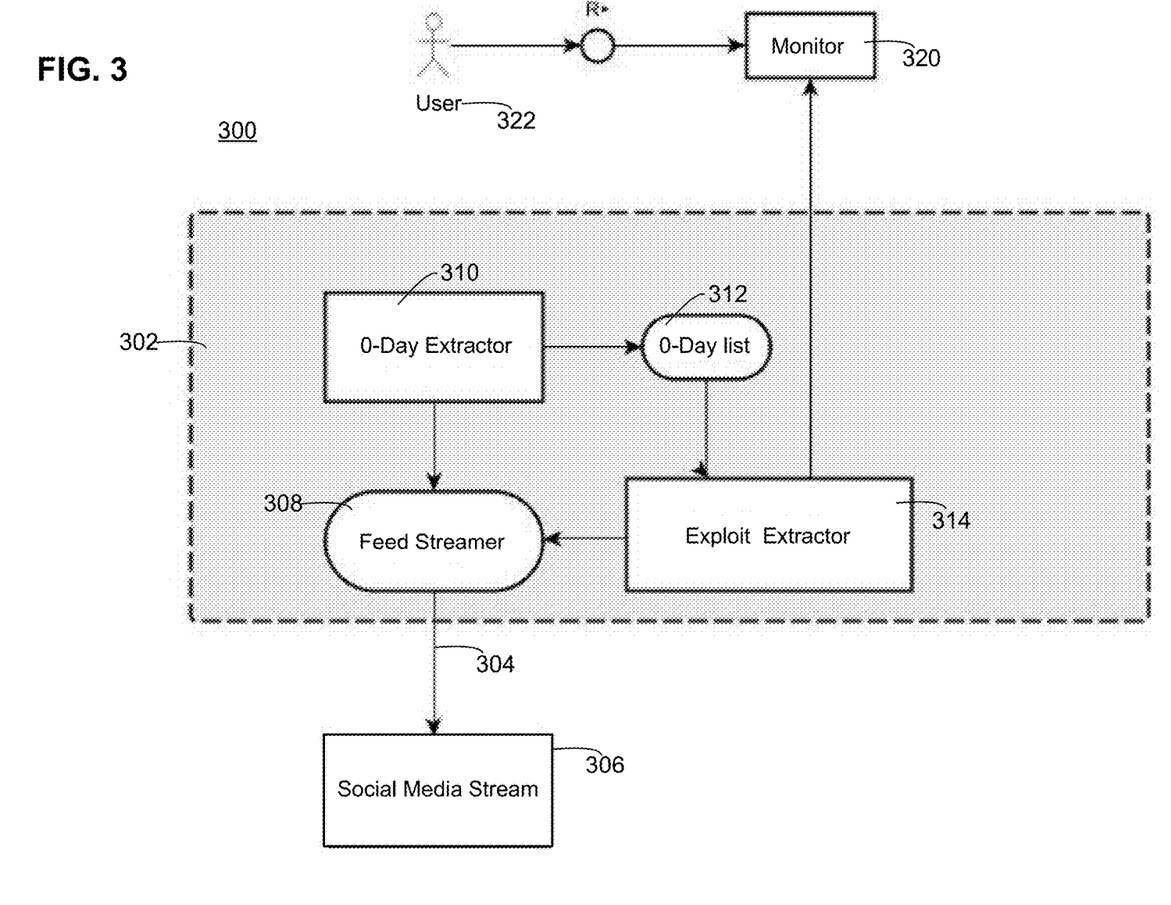
FIG. 3 is a simplified view of a system according to the example.

FIG. 3 is a simplified view of a system according to the example. In particular, The architecture of this exemplary system 300 comprises tracking engine 302 and a connector 304 to the social media stream Application Program Interface (API) 306.

The system further comprises a feed streamer 308. This component manages the different social media streams.

The system further comprises a 0-day extractor 310. This component analyzes the collected streams in order to identify and extract the 0-day information published.

The 0-day extractor is in communication with a zero-day list 312. The 0-day list includes a set of identified 0-day vulnerabilities that are to be monitored. This list can be stored in a database, which in some embodiments may comprise an in-memory database.

The system further comprises an exploit extractor 314. This component takes the description of the 0-day vulnerabilities contained in the 0-day list, and tracks on the stream exploits related to those vulnerabilities.

The monitor 320 is an interface that displays to the user 322, the information about the detected 0-day vulnerabilities, and their related exploits. This monitor component may also be used as a configuration and management tool by the end user in order to establish her monitoring preferences.

Figure 4:
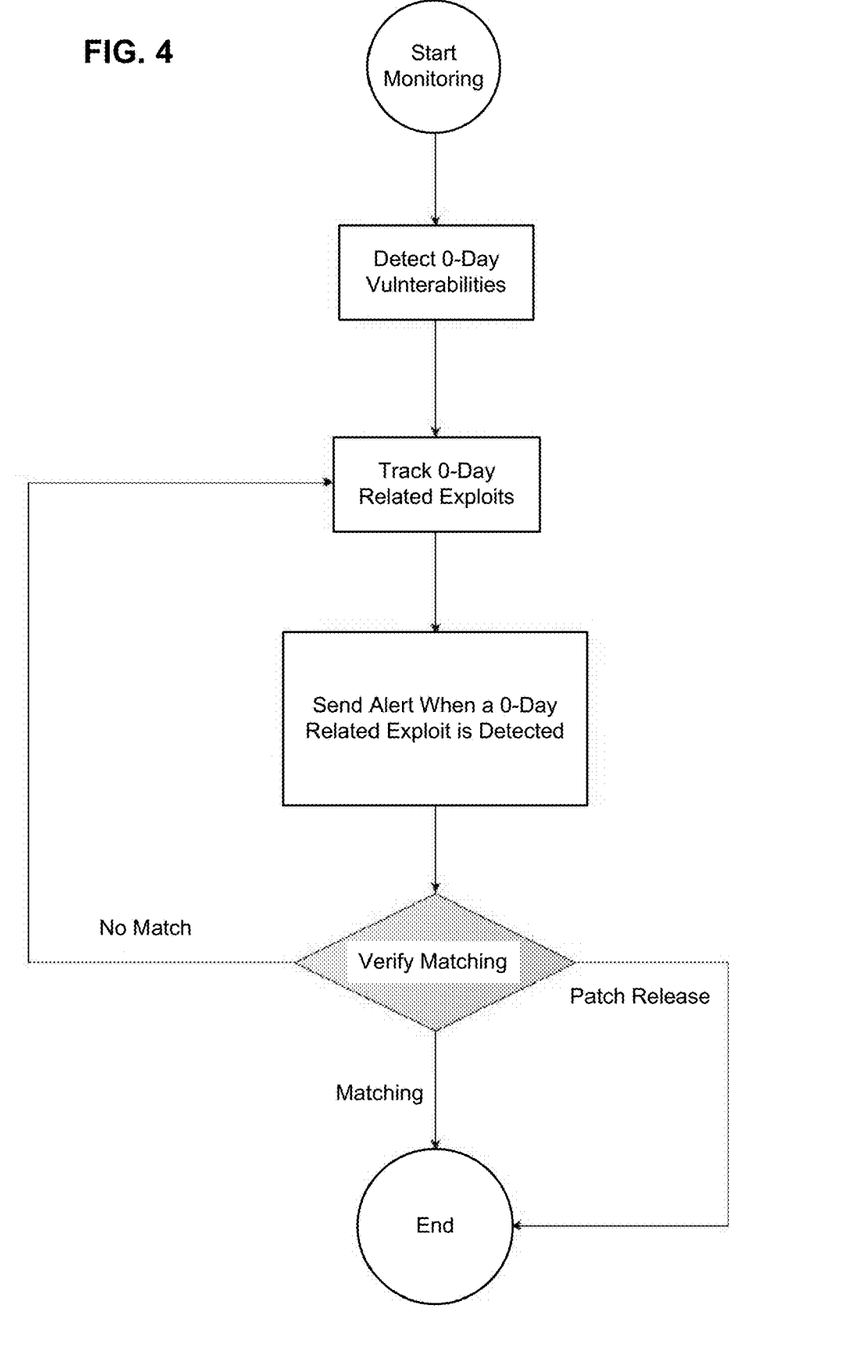
FIG. 4 is a simplified view showing a process flow according to the example.

FIG. 4 is a simplified view showing a process flow according to the example. In a first step, exploits related to previously-known zero-day vulnerabilities, are tracked.

An alert is sent to the user (as well as possibly others, e.g., as defined by a distribution list) via the monitor when a 0-day related exploit is detected. Matching is performed to determine whether the exploit fits the 0-day security vulnerability being tracked.

If a match between exploit and zero-day vulnerability is verified, the process ends. The existence of a patch may also be determined, resulting in the cessation of tracking in this particular example.

Figure 5:
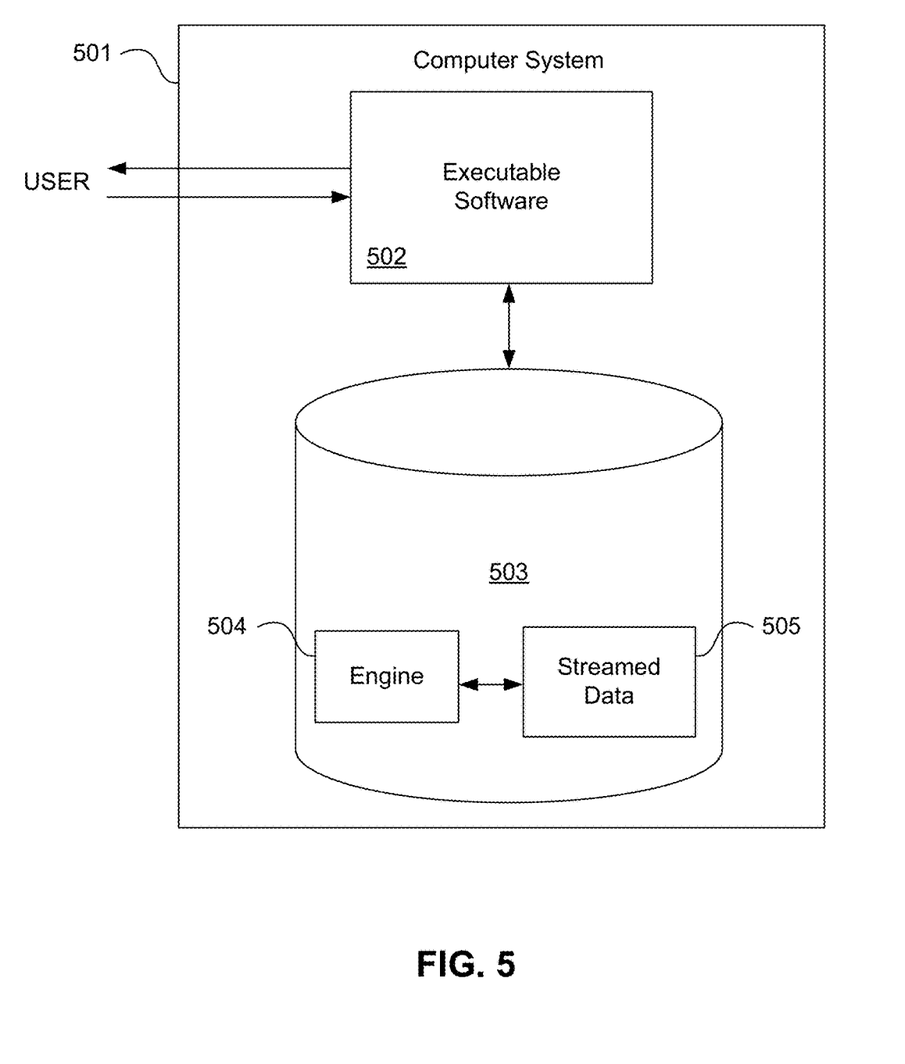
FIG. 5 illustrates hardware of a special purpose computing machine configured to perform security monitoring according to an embodiment.

While FIG. 1A shows the tracking system and its processing engine as part of an application layer overlying a database layer, this is not required. For example, FIG. 5 illustrates hardware of a special purpose computing machine configured to perform security monitoring according to an embodiment. In particular, computer system 501 comprises a processor 502 that is in electronic communication with a non-transitory computer-readable storage medium 503. This computer-readable storage medium has stored thereon code 505 corresponding to streamed social media data. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1A) the engine may be implemented in other ways, for example as part of an overlying application layer.

Figure 6:
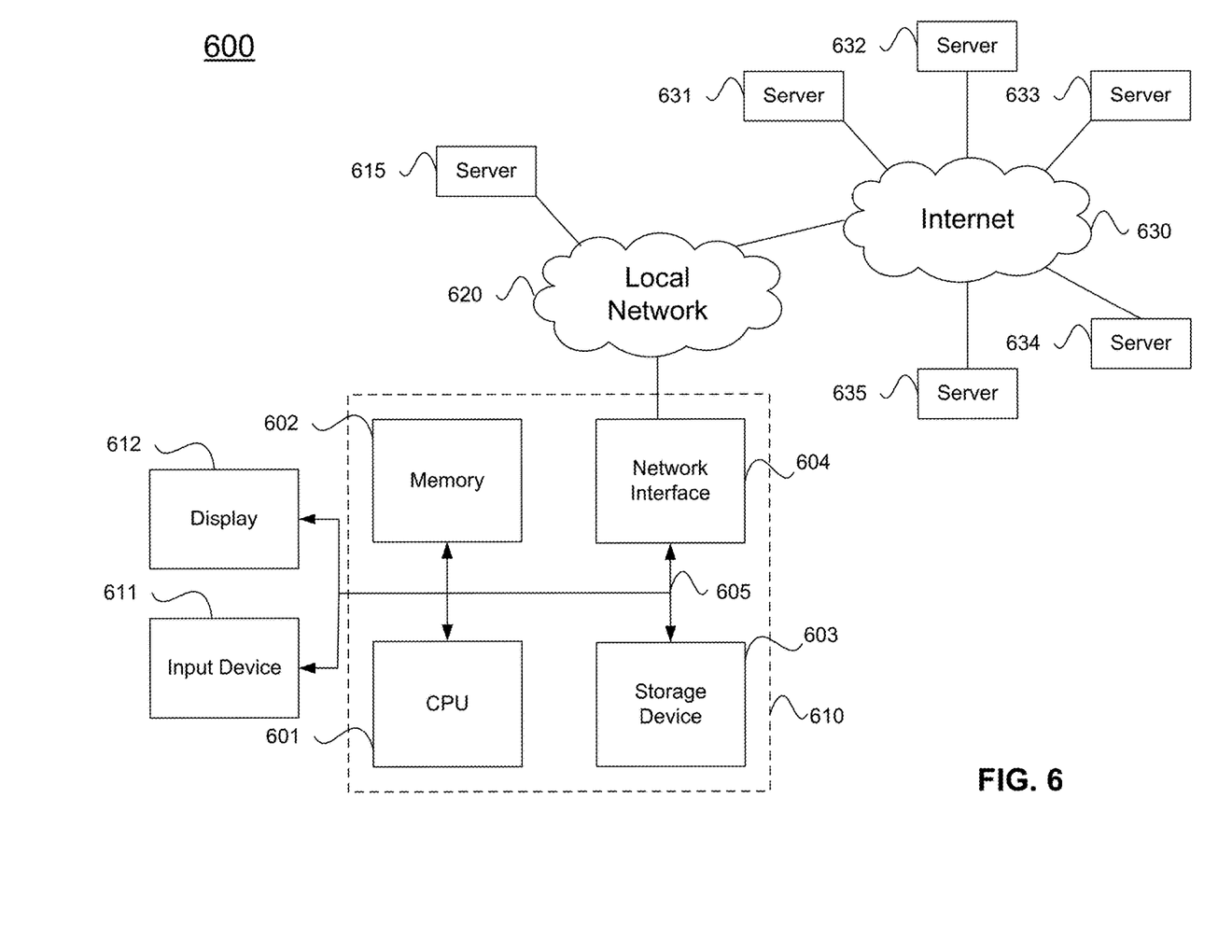
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
referencing, by an in-memory database engine, a zero-day security vulnerability to generate a parameter;
communicating, by the in-memory database engine, the parameter to a streaming component;
receiving, by the in-memory database engine, data harvested according to the parameter by the streaming component;
processing, by the in-memory database engine, the data according to a ruleset to generate information relating to an exploit of the zero-day security vulnerability;
storing, by the in-memory database engine, the information in an in-memory database;
communicating, by the in-memory database engine, the information as an alert to a user and to others on a distribution list;
generating, by the in-memory database engine, an updated parameter from the information;
sending, by the in-memory database engine, the updated parameter to the streaming component;
receiving by the in-memory database engine from the streaming component, updated data harvested according to the updated parameter, wherein:
the updated data indicates a patch of the zero-day security vulnerability;
halting streaming activity related to the zero-day security vulnerability by the streaming component upon receiving the updated data including the patch;
processing by the in-memory database engine, the updated data according to the ruleset to generate updated information regarding another exploit of the zero-day security vulnerability, the updated information comprising an exploit code;
storing, by the in-memory database engine, the updated information; and
communicating, by the in-memory database engine, the updated information to the user, wherein the zero-day security vulnerability is fixed by referencing the exploit code in the communicated updated information.

2. A method as in claim 1 wherein the data includes a date of the zero-day security vulnerability, a date of the exploit, a product identity, a hacker identity, a nature of the zero-day security vulnerability, and/or an exploit methodology.

3. A method as in claim 1 further comprising processing, by the in-memory database engine, the data to compute a vulnerability score.

4. A non-transitory computer readable storage medium embodying a computer program for performing operations, said operations comprising:
referencing, by an in-memory database engine, a zero-day security vulnerability to generate a parameter;
communicating, by the in-memory database engine, the parameter to a streaming component;
receiving, by the in-memory database engine, data harvested according to the parameter by the streaming component, the parameter comprising a keyword;
processing, by the in-memory database engine, the data according to a ruleset to generate information relating to an exploit of the zero-day security vulnerability;
storing, by the in-memory database engine, the information in an in-memory database;
communicating, by the in-memory database engine, the information as an alert to a user and to others on a distribution list;
generating, by the in-memory database engine, an updated parameter from the information;
sending, by the in-memory database engine, the updated parameter to the streaming component;
receiving, by the in-memory database engine from the streaming component, updated data harvested according to the updated parameter, wherein:
the updated data indicates a patch of the zero-day security vulnerability;
halting streaming activity related to the zero-day security vulnerability by the streaming component upon receiving the updated data indicating the patch;
processing by the in-memory database engine, the updated data according to the ruleset to generate updated information regarding another exploit of the zero-day security vulnerability, the updated information comprising an exploit code;
storing, by the in-memory database engine, the updated information in the in-memory database; and
communicating, by the in-memory database engine, the updated information to the user, wherein the zero-day security vulnerability is fixed by referencing the exploit code in the communicated updated information.

5. A non-transitory computer readable storage medium as in claim 4 wherein the updated parameter comprises a second keyword.

6. A computer system comprising:
a memory and one or more processors;
a software program, executable on said computer system, the software program configured to cause an in-memory database engine to:
reference a zero-day security vulnerability to generate a parameter;
communicate the parameter to a streaming component;
receive data harvested by the streaming component according to the parameter;
process the data according to a ruleset to generate information relating to an exploit of the zero-day security vulnerability;
store the information in an in-memory database;
communicate the information as an alert to a user and to others on a distribution list;
generate an updated parameter from the information;
send the updated parameter to the streaming component;
receive from the streaming component, updated data harvested according to the updated parameter, wherein:
the updated data indicates a patch of the zero-day security vulnerability;
halt streaming activity related to the zero-day security vulnerability by the streaming component upon receiving the updated data indicating the patch;
process the updated data according to the ruleset to generate updated information regarding another exploit of the zero-day security vulnerability, the updated information comprising an exploit code;
store the updated information in the in-memory database; and
communicate the updated information to the user, wherein the zero-day security vulnerability is fixed by referencing the exploit code in the communicated updated information.

7. A computer system as in claim 6 wherein the parameter comprises a keyword.

* * * * *